United States Patent [19]

Erixon

[11] E Re. 28,869

[45] Reissued June 22, 1976

[54] CARTRIDGE MAGAZINE FOR POWER TOOLS

[75] Inventor: Karl Erich Samuel Erixon, Huskvarna, Sweden

[73] Assignee: Gunnebo Bruks Aktiebolag, Gunnebobruk, Sweden

[22] Filed: Feb. 14, 1975

[21] Appl. No.: 550,148

Related U.S. Patent Documents

Reissue of:

[64] Patent No.: 3,808,723
Issued: May 7, 1974
Appl. No.: 319,395
Filed: Dec. 29, 1972

[30] Foreign Application Priority Data

Apr. 4, 1972 Sweden ..... 4292/72

[52] U.S. Cl. ..... 42/6; 42/49 R; 124/50

[51] Int. Cl.[2] ..... F41C 25/00

[58] Field of Search ..... 42/49 R, 6, 7, 87, 88, 42/1 R; 124/52, 53, 48–50; 227/9–11

[56] References Cited

UNITED STATES PATENTS

| | | | |
|---|---|---|---|
| 422,846 | 3/1890 | Sneider | 42/49 R |
| 824,165 | 6/1906 | Wisewell | 42/7 |
| 910,397 | 1/1909 | Laudensack | 42/87 |

*Primary Examiner*—Charles T. Jordan
*Attorney, Agent, or Firm*—Holman & Stern

[57] ABSTRACT

A cartridge magazine for power tools by virtue of which the loading of the tool with a cartridge is semi-automated and a great number of such cartridges are stored in this magazine in readiness for a rapid reloading of the tool. The cartridges are contained behind one another in a channel and the part constituting the channel is tiltable between two end positions, in one of which the channel communicates with a cartridge chamber in the inner end of the barrel of the tool.

8 Claims, 7 Drawing Figures

CARTRIDGE MAGAZINE FOR POWER TOOLS

Matter enclosed in heavy brackets [ ] appears in the original patent but forms no part of this reissue specification; matter printed in italics indicates the additions made by reissue.

The present invention relates to a magazine for cartridges which is used in power tools and constitutes a means for simplifying the reloading of the tool.

BACKGROUND OF THE INVENTION

In most shooting implements the loading procedure is cumbersome and time-consuming, since both pin or bolt and propellant charge has to be applied in the implement, before it is ready for shooting. Certain attempts have been made earlier to automate parts of the procedure, but as a consequence the implement became complicated and expensive to manufacture. If the demand for automation of the procedure is not higher than that certain manipulations might be forestalled, a cheap and simple device can nevertheless achieve a considerable simplification of the procedure.

SUMMARY OF THE INVENTION

In accordance with the present invention a device on a cartridge magazine is presented, by virtue of which the loading of the tool with a propellant charge is semi-automated and a great number of such charges are stored in this magazine in readiness for a rapid reloading of the tool. The magazine is arranged so that it can readily be exchanged in a holder on the tool and by using several magazines a rapid and simple loading is made possible without the loss of time brought about by the filling up of the magazine. These advantages, and possibly also others are obtained in accordance with the invention by a design of a cartridge magazine in which the cartridges are contained behind one another in a channel and the part of the magazine which constitutes the channel is tiltable between two end positions, in one of these the channel communicates with a cartridge chamber arranged in the tool in the inner end of the barrel of the tool.

BRIEF DESCRIPTION OF THE DRAWINGS

Some examples of the realization of the magazine in accordance with the invention are described in the following with reference to the enclosed drawing, which shows in FIG. 1 a tubular magazine with holder on a power tool.

DETAILED DESCRIPTION OF THE DRAWINGS

Figures 1, 2:
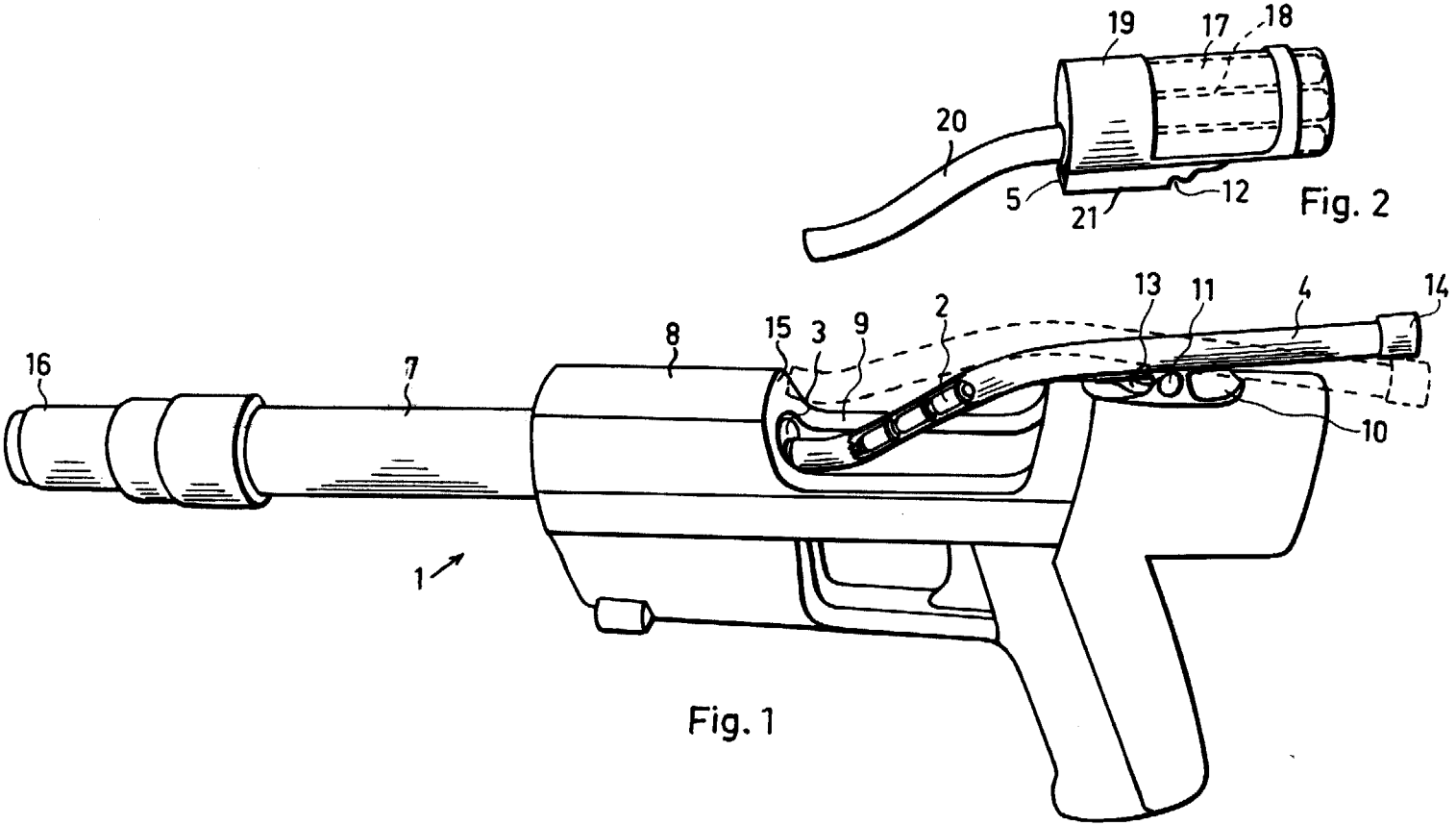
FIG. 2 a drum magazine intended for the same holder as the magazine in FIG. 1.

On the drawing is shown a power tool which is operated with cartridges 2 which are introduced into the cartridge chamber 3 one by one and fired. The tool is intended originally to be loaded with one cartridge directly into the cartridge chamber, to be closed and fired, whereupon the loading procedure is repeated.

Figure 3:
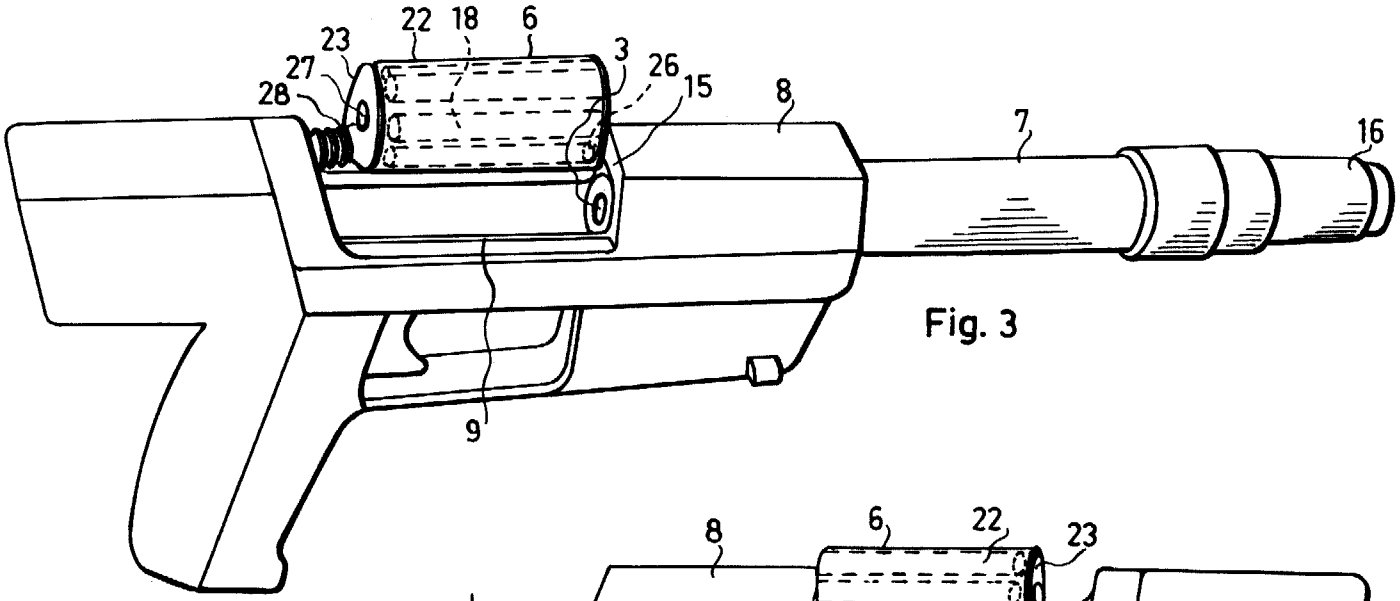
FIG. 3 a variant of a drum magazine together with holder for the same.
Figure 4:
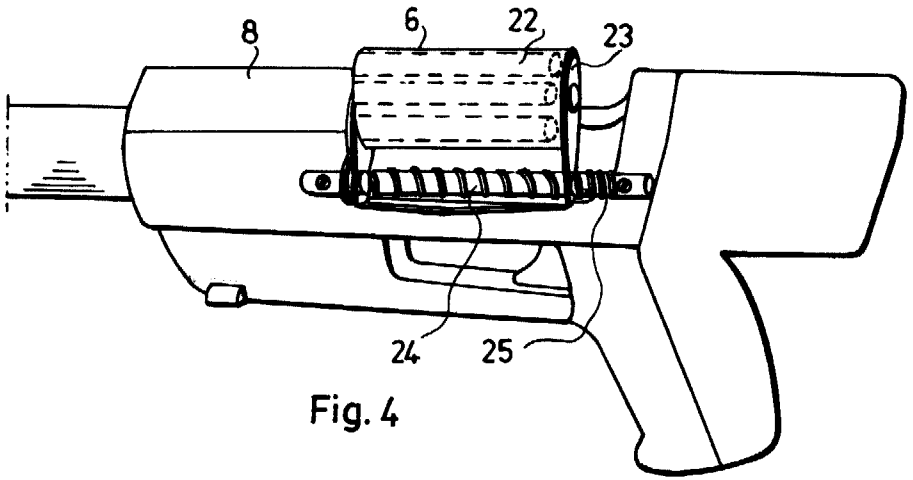
FIG. 4 the holder for the magazine in FIG. 3.

This longwinded procedure which comprises taking the cartridges one by one from a box or the like and inserting them into the cartridge chamber, is eliminated by arranging a cartridge magazine 4, 5 or 6, placed in FIG. 1 on top of the tool and in FIGS. 3 and 4 at the side of the same. The drawings also indicate that the tool must have a special design to allow the employment of such a cartridge magazine. The tool is shown in pulled out condition, that is to say its barrel 7 with driving piston inside it has been pulled out of the body 8 of the tool to a loading position, the cartridge chamber 3 being laid bare in a loading opening 9 in the body.

The solution in principle of the problem to contrive a cartridge magazine in accordance with the invention will now be shown and described in connection with FIG. 1. Above the rear portion of the body 8 a holder 10 is fixed which has a transverse axle 11 which carries the tubular cartridge magazine 4. This is provided on the underside with a transverse notch 12 (FIG. 2) in which there is a spring catch, so that the magazine can be mounted on the axle 11 and be maintained on the same by means of the notch and the catch. In the holder 10 is also a spring 13 which presses on the magazine, so that the same is maintained in raised position (broken lines in FIG. 1). At the rear end of the magazine is a screw cap 14 which covers the rear opening of the magazine. When the cap is removed cartridges 2 can be filled in through this opening.

The loading of the tool with a cartridge 2 takes place in such a way, that the barrel 7 is pulled into the loading position (shown) and the front end of the magazine is pressed down by hand into the loading position at the same time as the tool is inclined somewhat forwards. The cartridges will then under their own weight fall downwards/forwards in the magazine and the frontmost cartridge enters into the cartridge chamber 3. The magazine is then raised again into the position shown in broken lines by the spring 13, but not higher than that the cartridges in the tube are prevented by the front wall 15 in the loading opening from falling out. The tool is then closed up and after pushing a pin into its mouthpiece 16 it is ready for shooting. A tubular magazine of the type as shown in FIG. 1 holds about 15 cartridges and, as mentioned earlier, can readily be filled up when requied.

A substantially increased space for cartridges is obtained by realizing the magazine in accordance with FIG. 2. This realization has the shape of a drum 17, comprising a number of axial channels 18 accomodating the cartridges 2. The drum is located in a housing 19 from which extends a tube 20 in a forward direction. Underneath the housing is a socket 21 for the holder 10. The drum can be rotated inside the housing and has defined angular positions which each correspond to a connection of any one of the channels 18 to the tube 20. The cartridges in the channel connected are then able to drop through the tube towards the cartridge chamber 3, when the magazine is mounted on the tool. The drum can be extracted from the tool and either be filled up again with new cartridges or be substituted by a full magazine. The loading procedure for the rest is the same as that described above in connection with the magazine in accordance with FIG. 1.

The design of the body with loading opening as shown on the drawing also allows the arrangement of a cartridge magazine 6 at one side of the loading opening, such as shown in FIGS. 3 and 4. This magazine consists of a drum 22, supported in a bracket 23, which in its turn is set up in a holder 24 on the tool. The bracket is mounted on the holder so that it can be folded down and extend in collapsed position into the loading opening, while it is normally held in the position as shown by a helical spring 25. In the front part of the bracket is a hole 26 to which can be connected every one of the channels 18 by rotation of the drum. The cartridges in the channel connected to the hole can then all forwards towards the cartridge chamber 3, when the magazine is held in folded down position. In raised position (shown) the cartridges are held in position in the channel, since the hole 26 is then covered by the front wall 15, as mentioned before in respect of the magazine 4 and 5. The drum 22 can be removed from the bracket by pulling the same a little apart, so that a pivot 27 projecting on the drum can slide out of the hole 28 in the bracket where it is journalled. A drum filled with cartridges is put in position by pulling the bracket away, so that a pivot 27 in each end of the drum can slide into the corresponding hole 28 in the bracket, whereupon the pivots thanks to the restoring spring force in the bracket, are retained in the holes.

The use of the magazine 6 is fully analogous to that described previously in connection with magazines 4 and 5, that is to say, the tool is loaded by pulling out the barrel to the position shown, inclining the tool forwards, folding the magazine down into the loading opening, so that a cartridge has the opportunity of dropping into the cartridge chamber and, after the magazine has reverted to its normal position, the barrel is pushed back in again.

Figure 5:
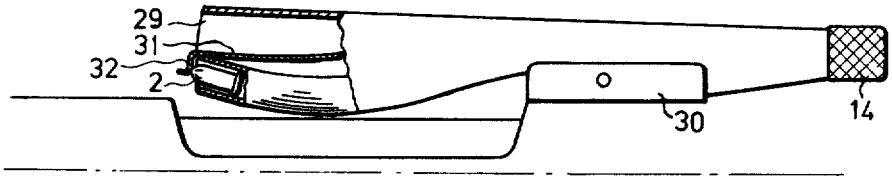
FIGS. 5 and 6 a locking and guiding device for one of the magazines.
Figure 6:
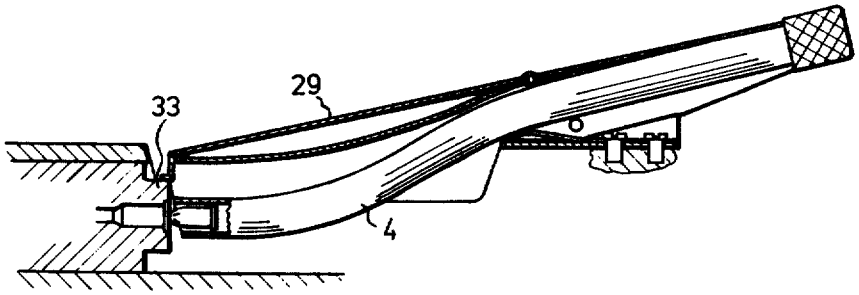

A device apt to facilitate still further the loading procedure is shown in FIGS. 5 and 6. In FIG. 5 the device is shown in rest position and in FIG. 6 in loading position. The cartridge tube 4 is the same as shown in FIG. 1, except that it has been provided in this embodiment with a locking and controlling device, by means of which the centering of the magazine in loading position takes place, and the cartridges are retained when the magazine is in rest position. As can be seen from FIGS. 5, 6 the magazine has a body 29 with a holder 30, fixed on an axle on the upper side of the tool. Between the body and the tube 4 a leaf spring 31 is inserted with forward tension. Its front end has a double band 32 and the bottom part of this is located in rest position (FIG. 5), thanks to the clamping of the spring, in front of the mouth of the tube, thus preventing the cartridges 2 from dropping out of the tube.

In loading position (FIG. 6) the spring and the front end of the body constitute a guiding device for the tube. This device is suitable for tools which have a cartridge chamber somewhat drawn back from the barrel, such as shown in FIG. 6. The cartridge chamber is located in a plug 33 in the rear end of the barrel and against this plug rest the body and the spring in loading position, so that the mouth of the tube is centered exactly opposite the cartridge chamber. The cartridges with which the tool is loaded can then drop freely into the cartridge chamber.

Figure 7:
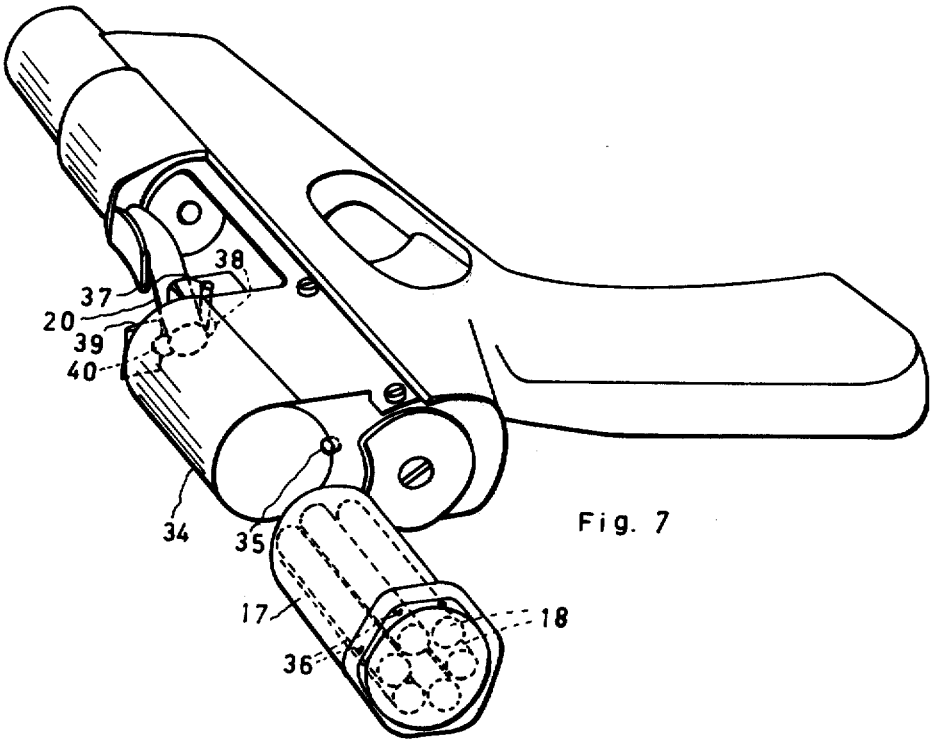
FIG. 7 a drum magazine with a pivoted loading tube.

A still further embodiment of a magazine according to the invention is shown in FIG. 7. On the rear portion of the tool a housing 34 is fastened and its inner cylindrical spacing is adapted to accomodate a drum 17 provided with axial channels as described with reference to FIG. 2. The drum can be rotated in the housing, and a spring ball 35 snaps into recesses 36 in the periphery of the drum, when any one of the channels 18 faces the tube 20, which connects the channel and the cartridge chamber. This tube is pivoted at the front end of the housing by means of a pin 37, which penetrates a lug 38 projecting on the underside of the tube. The tube is usually kept in a raised position by means of a spring 39 secured to the front end of the housing and acting on a knob 40 on the topside of the tube. The front end of the tube can, against the force of this spring, be pushed down to the cartridge chamber, when loading takes place.

The embodiments of the invention described above are preferred realizations. Other realizations and additional devices may however come within the scope of the invention, e.g., handles, catches etc. for facilitating the taking in and out of the magazine or the holding movement itself. The tube may also include a spring for the pushing forward of the cartridges. The invention is defined in its entirety in the following claims.

What is claimed is:

[1. A cartridge magazine for loading cartridges into a cartridge chamber disposed in an inner end of a barrel of a power tool, said magazine being adapted to be fixed on the outside of the tool in a holder means and being provided with at least one channel in which the cartridges are contained in series behind one another, wherein at least the part of the magazine which constitutes the channel is tiltable between two end positions, and that in one of said positions the channel communicates with the cartridge chamber of the tool to effect loading thereof.]

[2. Cartridge magazine in accordance with claim 1, wherein the holder means is provided with an elastic device which acts upon the tiltable part of the magazine in the direction of the cartridge chamber.]

[3. Cartridge magazine in accordance with claim 1, wherein the channel is formed by a tube, open at the end towards the cartridge chamber, and wherein a cap is provided to close the other end of the tube.]

[4. Cartridge magazine in accordance with claim 3, wherein the tube forms a weak S-bend.]

[5. Cartridge magazine in accordance with claim 1 including a multitude of channels lying next to one another in a rotatable drum inside a casing and provided with a connecting channel to the cartridge chamber.]

[6. Cartridge magazine in accordance with claim 5, wherein the connecting channel is formed by a weakly S-bent tube disposed between the casing and the cartridge chamber.]

[7. Cartridge magazine in accordance with claim 6, wherein the tube is pivoted to the casing and held in raised position by a spring.]

[8. Cartridge magazine in accordance with claim 5, wherein the drum is mounted between two sides of the casing which is mounted tiltable in said holder means and that the connecting channel is constituted of a hole in a side of said casing towards the cartridge chamber.]

[9. Cartridge chamber in accordance with claim 3, wherein the tube is fixed in a body provided with a catch device in the form of a springy stop which is normally pushed over the open end of the tube.]

[10. Cartridge magazine in accordance with claim 3, wherein a helical spring is provided in the tube which pushes the cartridge in the tube in a direction from the cap forwards.]

[11. Cartridge magazine in accordance with claim 5, wherein the drum is provided with recesses, one for every channel, and that a catch is provided in the casing to snap into such a recess, the catch, the recess and the inlet end of the connecting channel being positioned in relation to each other so that the catch snaps into a recess when the corresponding channel faces the inlet end of the connecting channel.]

*12. A cartridge magazine for loading cartridges into a cartridge chamber disposed in an inner end of a barrel of a power tool, said magazine being adapted to be fixed on the outside of the tool in a holder means and being provided with a rotatable drum having a multitude of channels lying next to one another in which cartridges are contained in series behind one another, wherein the drum is mounted inside a casing which is mounted in said holder means and tiltable between two end positions, and wherein one of the channels in one of said end positions of the casing communicates with the cartridge chamber of the tool to effect loading thereof.*

*13. A cartridge magazine according to claim 12, wherein the holder means is provided with an elastic device which acts upon the casing in the direction of the cartridge chamber.*

*14. A cartridge magazine according to claim 12, wherein the drum is mounted between two sides of the casing and an opening is provided in a side of the casing towards the cartridge chamber.*

*15. A cartridge magazine for loading cartridges into a cartridge chamber disposed in an inner end of a barrel of a power tool, said magazine being adapted to be fixed of the outside of the tool in a holder means and being provided with a rotatable drum mounted inside a casing and having a multitude of channels lying next to one another in which cartridges are contained in series behind one another, said magazine also being provided with a connecting channel disposed between the drum and the cartridge chamber, wherein at least that part of the magazine constituting the connecting channel is tiltable between two end positions, so that in one of said positions the connecting channel communicates at one end with the cartridge chamber and at the other end with one of said channels containing cartridges to effect loading of the tool.*

*16. A cartridge magazine according to claim 15, wherein the holder means is provided with an elastic device which acts upon the tiltable part of the magazine in the direction of the cartridge chamber.*

*17. A cartridge magazine according to claim 15, wherein the connecting channel comprises a tube formed as a weak S-bend.*

*18. A cartridge magazine according to claim 15, wherein the drum is provided with recesses, one for every channel, a catch being provided in the casing to snap into one of said recesses, and wherein the catch, the recess and the inlet end of the connecting channel are positioned in relation to each other so that the catch snaps into a recess when the corresponding channel faces the inlet end of the connecting channel.*

*19. A cartridge magazine for loading cartridges into a cartridge chamber disposed in the inner end of a barrel of a power tool, said magazine being adapted to be fixed on the outside of the tool in a holder means and being provided with a tube forming a weak S-bend which is open at the end towards the cartridge chamber and closed at the other end, and in which the cartridges are contained in series behind one another, wherein the tube is fixed in a body provided with a catch device in the form of a springy stop which is normally pushed over the open end of the tube, and said body is mounted in the holder means and tiltable between two end positions, in one of these positions the springy stop being pushed away from the open end of the tube which thereby communicates with the cartridge chamber of the tool to effect loading thereof.*

* * * * *